(12) United States Patent
Jennrich et al.

(10) Patent No.: US 7,432,334 B2
(45) Date of Patent: Oct. 7, 2008

(54) SILICONE-MODIFIED SINGLE-COMPONENT CASTING COMPOUND

(75) Inventors: Irene Jennrich, Winnenden (DE); Kristian Leo, Burgstetten (DE); Markus Muzic, Murr (DE); Wolfgang Endres, Remshalden (DE); Hubert Greif, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 596 days.

(21) Appl. No.: 10/399,080

(22) PCT Filed: Sep. 28, 2001

(86) PCT No.: PCT/DE01/03742

§ 371 (c)(1),
(2), (4) Date: Aug. 25, 2003

(87) PCT Pub. No.: WO02/32997

PCT Pub. Date: Apr. 25, 2002

(65) Prior Publication Data

US 2004/0036199 A1    Feb. 26, 2004

(30) Foreign Application Priority Data

Oct. 14, 2000   (DE) ............................... 100 51 051

(51) Int. Cl.
*C08L 63/00*    (2006.01)

(52) U.S. Cl. .................. 525/476; 523/443; 523/466; 524/451; 524/268; 528/27

(58) Field of Classification Search .............. 525/476; 523/400–468; 524/261–268
See application file for complete search history.

(56) References Cited

U.S. PATENT DOCUMENTS

| | | | | |
|---|---|---|---|---|
| 4,113,791 A | * | 9/1978 | Smith et al. | 523/427 |
| 4,239,725 A | * | 12/1980 | Crivello | 264/328.6 |
| 4,853,434 A | | 8/1989 | Block | |
| 5,070,154 A | * | 12/1991 | Shiobara et al. | 525/422 |
| 5,089,543 A | * | 2/1992 | Kurio et al. | 523/466 |
| 5,169,911 A | | 12/1992 | Lupinski et al. | |
| 5,248,710 A | | 9/1993 | Shiobara et al. | |
| 5,284,938 A | * | 2/1994 | Dangayach et al. | 523/457 |
| 5,739,217 A | * | 4/1998 | Hagiwara et al. | 525/476 |
| 5,863,970 A | * | 1/1999 | Ghoshal et al. | 523/434 |
| 6,037,425 A | * | 3/2000 | Fukuzawa et al. | 525/481 |
| 6,180,693 B1 | * | 1/2001 | Tang et al. | 523/201 |
| 6,437,090 B1 | * | 8/2002 | Murai et al. | 528/416 |
| 2003/0212230 A1 | * | 11/2003 | Rubinsztajn et al. | 528/10 |
| 2004/0222549 A1 | * | 11/2004 | Sano et al. | 264/128 |

FOREIGN PATENT DOCUMENTS

| | | | |
|---|---|---|---|
| DE | 195 23 897 | | 1/1997 |
| DE | 196 38 630 | | 4/1998 |
| EP | 0 411 405 | | 2/1991 |
| JP | 06175554 | * | 6/1994 |

OTHER PUBLICATIONS

Handbook of Fillers, 2nd Edition authored by Wypych, 1999, Chem-Tec Publishing, pp. 305,312,318-322.*

* cited by examiner

*Primary Examiner*—Marc S Zimmer
(74) *Attorney, Agent, or Firm*—Kenyon & Kenyon LLP

(57) ABSTRACT

A casting compound based on a resin which cures by a chemical reaction. The casting compound is suitable for insulation of electric components and contains an epoxy resin component, a silicone-containing component, a filler, and a thermal initiator. This casting compound is processible as a single-component system.

25 Claims, 1 Drawing Sheet

SILICONE-MODIFIED SINGLE-COMPONENT CASTING COMPOUND

FIELD OF THE INVENTION

The present invention relates to a casting compound and a method of producing molded parts.

BACKGROUND INFORMATION

Casting compounds based on a resin which cures by a chemical reaction play a major role in the production of industrial parts and components. They are used, among other things, for insulation purposes in electric and electronic components. Such casting compounds may be in the form of two-component systems, where one component is a hardener, which is mixed with the other component containing reactive resins, fillers, etc. and then is processed immediately. Preparation of the casting compound is integrated into the processing operation and these compositions may not be stored in a ready-to-use state at room temperature for three to twelve months, for example. That occupational safety in handling the curing components may be ensured only at great technical complexity because the compounds used as the hardener are often hazardous to health or irritants, e.g., carboxylic anhydrides or amines. Single-component systems have been developed for this reason.

German Published Patent Application No. 196 38 630 discusses such casting materials for underfilling electric and electronic components which are used to protect against environmental influences and to stabilize solder connections on the components. Curing of the single-component systems discussed there is performed thermally and/or by exposure to UV radiation.

SUMMARY OF THE INVENTION

It is an object of the present invention to provide a casting compound which is stable in storage and is processible as a single-component system, has a high thermal conductivity and cracking resistance, provides an electrical insulation effect, and is resistant to corrosive media such as fuels even at high temperatures.

The object of the present invention may be achieved according to the present invention by providing a casting compound which is processible as a single-component system and contains a silicone-containing component. This casting compound has a low viscosity and a good capillary action during processing, is characterized by a high thermal conductivity and cracking resistance, and adheres to a wide variety of materials. In addition, it may withstand high thermal stresses and it is also resistant at high temperatures to the influence of fuels.

The casting compound has a short curing time and a favorable reaction profile and consequently is easily processible. This is accomplished through the choice of a suitable initiator, which includes a cationic crosslinking agent and a cocatalyst.

In an exemplary embodiment of the present invention, the casting compound contains up to 90 wt % of a silicone-containing component containing silicone elastomer particles as the silicone. This ensures a high mechanical load-bearing capacity in the cured state without an unwanted increase in the viscosity of the casting compound during processing.

DETAILED DESCRIPTION

Figure 1:
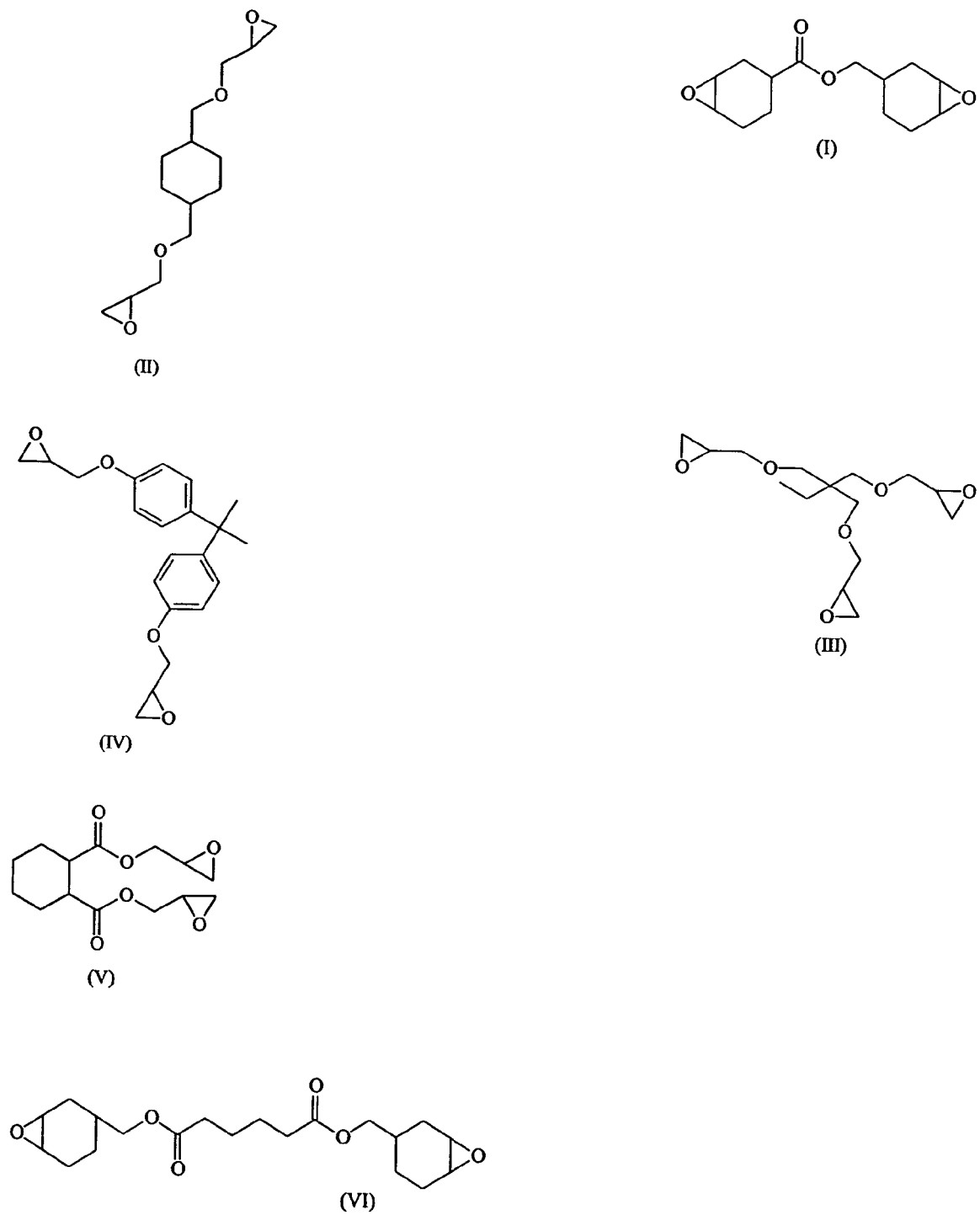
FIG. 1 shows compounds I to VI, which are ring-epoxidized cycloaliphatic diepoxies, for use in an epoxy resin component "A".

Casting compounds according to the present invention include four basic components, namely an epoxy resin component A, a silicone-containing component B, a filler C, and an initiator D. In addition, other components are also provided, these components generally being used in other casting compounds, e.g., foam suppressants, sedimentation inhibitors, and adhesive agents, the use of which is referred to in other systems.

In general, it should be noted that casting compounds form a stable system before and during processing to prevent separation of the components. Thus, the filler particles should form a stable dispersion with the epoxy resin components, and the epoxy resin components should in turn form stable emulsions with one another. This stability is ensured during processing as well as in curing of a casting compound.

A variety of monomeric compounds having an epoxy function may be used as epoxy resin component A, either alone or in mixture with other compounds with or without an epoxy function. However, diepoxies and/or triepoxies may be used; the commercially available compounds shown below are given as examples:

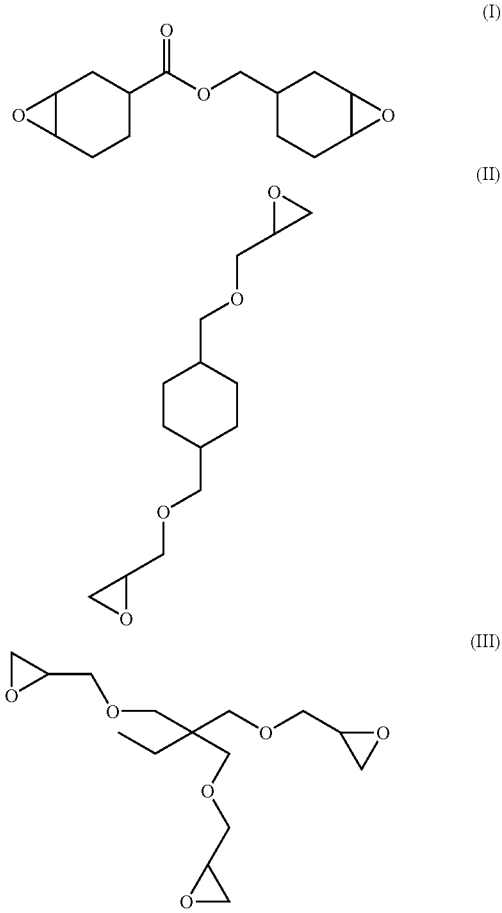

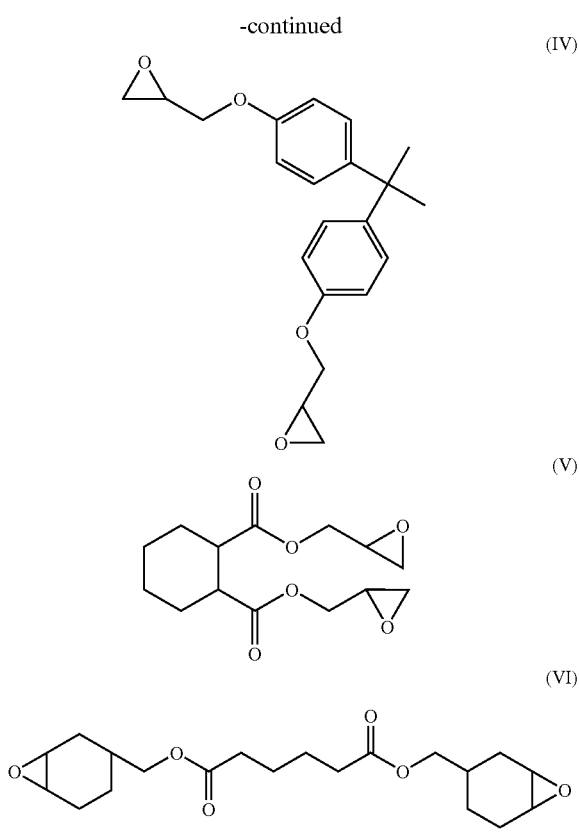

Epoxy resin component A may include one or more of compounds (I) through (VI) as well as other components. Ring-epoxidized cycloaliphatic diepoxies such as (I) and (VI) have proven to be especially suitable. Epoxy resin component A is present in the casting compound in the amount of 5 to 90 wt %, in particular 10 to 60 wt %.

Silicone-containing component B also contained in the casting compound is a dispersion of one or more silicones in an epoxy resin. Suitable silicones include both silicone block copolymers and silicone particles. The silicone particles may be silicone resin particles or silicone elastomer particles, they may have a particle diameter of 10 nm to 100 μm. The silicone particles may be used as core-shell particles including a chemically modified surface, but it has been found that untreated and/or surface-modified silicone particles, e.g., those treated with PMMA, are more suitable for the object of the present invention. Suitable epoxy resins may include all monomeric compounds having an epoxy function, used either alone or in mixtures with other compounds with or without an epoxy function. However, the use of one or more of the diepoxies (I) through (VI) indicated above may be useful. Silicone-containing component B contains 10 to 80 wt % silicone, in particular 40 wt %. The casting compound contains up to 90 wt % of silicone-containing component B.

The casting compound also contains one or more fillers C, a suitable choice of which is capable of preventing shrinkage of the casting compound during processing and makes the thermal conductivity of the casting compound in the cured state adjustable. Thus, for example, quartz powder, aluminum oxide, chalk, fused silica or talc, optionally in mixture with silicon carbide are suitable as filler C. The use of silanized quartz powder has proven especially suitable, where the silanization may be performed either in situ by adding a silane or in advance by silanizing the quartz powder. Filler C is present in the casting compound in the amount of 5 to 75 wt %, in particular 40 to 60 wt %.

As fourth component D, the casting compound contains an initiator which permits a sufficiently rapid reaction at an elevated temperature. Suitable initiators include both thermal initiators and photoinitiators.

To ensure that the casting compound will be processable as a single-component system, a cationic crosslinking agent was selected as the initiator. It may be, for example, a quinolinium, sulfonium, iodonium, or boroiodonium compound. These result in cationic polymerization of the epoxy resin.

The initiator may also contain a cocatalyst which functions in particular to lower the starting temperature of the reaction. It may be an agent such as benzopinacol which forms free radicals. The choice of initiator determines the course of the reaction in curing. The combination of a cationic crosslinking agent with a cocatalyst results in a suitable reaction rate profile characterized by an optimum, narrowly defined reaction temperature at which the reaction proceeds promptly, without a slow reaction starting at even lower temperatures such as room temperature. This is also a prerequisite for a good shelf life of the single-component system at room temperature.

The casting compound is processed at an elevated temperature to yield a molded article. The casting compound has such a low viscosity and such a high capillary action with appropriate heating that it is suitable for casting even difficult geometric shapes such as casting gaps having a diameter of <200 μm. At the same time, this permits very short cycle times. The casting compound after casting is exposed to a temperature of 60° C. to 110° C. for 30 to 300 minutes or 120° C. for 10 to 100 minutes to induce gelation of the casting compound. Then it is exposed to a temperature of 140° C. to 220° C. for 10 to 90 minutes to cure the molded article. The processing time is thus significantly less than 50% of the time normally required for casting a two-component composition.

The method steps of gelation and curing may be combined in a single step by exposing the casting compound to a temperature of 140° C. to 220° C. immediately after casting.

Exemplary embodiments of casting compounds and/or their formulations and the resulting properties in the cured state are presented below as examples.

Compositions:

| Example | 1 | 2 | 3 | 4 |
|---|---|---|---|---|
| Epoxy resin component A | 88 | 75 | 62 | 52 |
| Silicone-containing component B | 12 | 25 | 38 | 48 |
| Filler C | 100 | 100 | 100 | 100 |
| Silicone-containing foam suppressant | 0.075 | 0.075 | 0.075 | 0.075 |
| Sedimentation inhibitor | 0.2 | 0.2 | 0.2 | 0.2 |

These compositions are given in parts by weight, the initiator being added in very low concentrations of 0.1 to 5 wt % in each case. The compositions indicated above yield the following profile of properties:

| | |
|---|---|
| viscosity at 60° C. | 100 to 1000 mPas |
| After curing: | |
| linear shrinkage: | 0.4 to 0.7% |
| glass transition temperature: | 150 to 165° C. |
| thermal expansion coefficient: | 30 to 50 * $10^{-6}$ 1/° C. |

-continued

| | | |
|---|---|---|
| double | $K_{1c}$ | 0.8 to 1.15 MPa√m |
| torsion test: | $G_{1c}$ | 100 to 236 J/m² |
| thermal conductivity: | | 0.5 to 0.7 W/m * K |
| weight change in diesel fuel after 300 hours at 200° C.: | | 0 to 1.7% |
| change in volume in diesel fuel after 300 hours at 200° C.: | | 0 to 3.7% |
| change in flexural strength in diesel fuel after 300 hours at 200° C.: | | 7.5 to 26% |
| change in selvedge thread elongation in diesel fuel after 300 hours at 200° C.: | | 7.5 to 35% |

The casting compound is suitable, e.g., for electrical insulation and mechanical fixation and to protect electric windings of electromagnetic actuators from corrosive media. Such actuators may be integrated into solenoid valves, for example, specifically in diesel or gasoline solenoid valves.

The present invention is not limited to the exemplary embodiments described here, but instead others are also conceivable in addition to the fields of application described here, e.g., use of the casting compound in the manufacture of sensors, in particular for the engine compartment of motor vehicles, and transmissions and fuel tanks, in particular for motor vehicles.

What is claimed is:

1. A casting compound based on a resin which cures by a chemical reaction for use in an insulation of an electric component, the casting compound comprising:
    an epoxy resin component;
    a silicone-containing component;
    a filler; and
    an initiator which includes a co-catalyst;
    wherein the casting compound is processible as a single-component system;
    wherein the filler is a talc;
    wherein the epoxy resin component includes an epoxy resin based on a cycloaliphatic diepoxy;
    wherein the initiator includes a cationic crosslinking agent;
    wherein the cationic crosslinking agent includes a boroiodonium compound; and
    wherein the initiator defines a reaction rate profile characterized by a narrowly defined reaction temperature, the narrowly defined reaction temperature being above room temperature such that the casting compound is stable at room temperature.

2. The casting compound of claim 1, wherein the epoxy resin component is present in an amount of 5 to 90 wt %.

3. The casting compound of claim 1, wherein the silicone-containing component includes a dispersion of a silicone in an epoxy resin based on a diepoxy.

4. The casting compound of claim 1, wherein the silicone-containing component is present in an amount of up to 90 wt %.

5. The casting compound of claim 3, wherein the silicone-containing component includes 10 to 80 wt % of a silicone.

6. The casting compound of claim 4, wherein the silicone-containing component includes 10 to 80 wt % of a silicone.

7. The casting compound of claim 3, wherein the silicone-containing component includes silicone elastomer particles as the silicone.

8. The casting compound of claim 7, wherein the silicone elastomer particles have a particle diameter of 10 nm to 100 μm.

9. The casting compound of claim 1, wherein the filler includes at least one of a powdered quartz and an aluminum oxide.

10. The casting compound of claim 1, wherein the filler is present in an amount of 5 to 75 wt %

11. The casting compound of claim 1, wherein the filler is present in the amount of 40 to 60 wt %.

12. The casting compound of claim 1, wherein the co-catalyst includes a radical former.

13. The casting compound of claim 1, wherein the co-catalyst includes a benzopinacol.

14. The casting compound of claim 1, wherein the casting compound is free of anhydride.

15. The casting compound of claim 1, wherein the casting compound is used to manufacture an electromagnetic actuator.

16. The casting compound of claim 1, wherein the casting compound is used to manufacture at least one of a solenoid valve, a diesel solenoid valve and a gasoline solenoid valve.

17. The casting compound of claim 1, wherein the casting compound is used to manufacture a sensor for an engine compartment of a motor vehicle.

18. The casting compound of claim 1, wherein the casting compound is used to manufacture a transmission for a motor vehicle.

19. The casting compound of claim 1, wherein the casting compound is used to manufacture a fuel tank for a motor vehicle.

20. The casting compound of claim 1, wherein the filler includes a quartz powder.

21. The casting compound of claim 1, wherein the initiator is added in an amount of 0.1 to 5 wt %.

22. A casting compound based on a resin which cures by a chemical reaction for use in an insulation of an electric component, the casting compound comprising:
    an epoxy resin component;
    a silicone-containing component;
    a filler; and
    an initiator which includes a co-catalyst;
    wherein the casting compound is processible as a single-component system;
    wherein the filler is a talc;
    wherein the initiator includes a cationic crosslinking agent;
    wherein the cationic crosslinking agent includes a boroiodonium compound; and
    wherein the initiator defines a reaction rate profile characterized by a narrowly defined reaction temperature, the narrowly defined reaction temperature being above room temperature such that the casting compound is stable at room temperature.

23. A method for manufacturing a molded part for use in insulating an electric component, the method comprising:
    introducing a casting compound as a single-component system into a casting mold;
    exposing the casting compound to a first elevated temperature to form a gel; and
    exposing the casting compound to a second elevated temperature to cure the molded part;
    wherein the casting compound includes:
        an epoxy resin component;
        a silicone-containing component;
        a filler; and
        an initiator which includes a co-catalyst;
    wherein the filler is a talc;
    wherein the epoxy resin component includes an epoxy resin based on a cycloaliphatic diepoxy;
    wherein the initiator includes a cationic crosslinking agent;

wherein the cationic crosslinking agent includes a boroiodonium compound: and wherein the initiator defines a reaction rate profile characterized by a narrowly defined reaction temperature, the narrowly defined reaction temperature being above room temperature such that the casting compound is stable at room temperature.

24. A method for manufacturing a molded part for use in insulating an electric component, the method comprising:
   introducing a casting compound as a single-component system into a casting mold;
   exposing the casting compound to a first elevated temperature to form a gel; and
   exposing the casting compound to a second elevated temperature to cure the molded part;
   wherein the casting compound includes:
      an epoxy resin component;
      a silicone-containing component;
      a filler; and
      an initiator which includes a co-catalyst;
   wherein the first elevated temperature is one of 60 to 110° C. for 30 to 300 minutes and 100 to 140° C. for 10 to 100 minutes;
   wherein the filler is a talc;
   wherein the initiator includes a cationic crosslinking agent;
   wherein the cationic crosslinking agent includes a boroiodonium compound; and
   wherein the initiator defines a reaction rate profile characterized by a narrowly defined reaction temperature, the narrowly defined reaction temperature being above room temperature such that the casting compound is stable at room temperature.

25. A method for manufacturing a molded part for use in insulating an electric component, the method comprising:
   introducing a casting compound as a single-component system into a casting mold;
   exposing the casting compound to a first elevated temperature to form a gel; and
   exposing the casting compound to a second elevated temperature to cure the molded part;
   wherein the casting compound includes:
      an epoxy resin component;
      a silicone-containing component;
      a filler; and
      an initiator which includes a co-catalyst;
   wherein the second elevated temperature is 140 to 220° C. for 10 to 90 minutes;
   wherein the filler is a talc;
   wherein the epoxy resin component includes an epoxy resin based on a cycloaliphatic diepoxy;
   wherein the initiator includes a cationic crosslinking agent;
   wherein the cationic crosslinking agent includes a boroiodonium compound; and
   wherein the initiator defines a reaction rate profile characterized by a narrowly defined reaction temperature, the narrowly defined reaction temperature being above room temperature such that the casting compound is stable at room temperature.

* * * * *